United States Patent
Lo (10) Patent No.: US 7,571,856 B2
(45) Date of Patent: Aug. 11, 2009

(54) COUNTERFEIT-PROOF LABELS HAVING AN OPTICALLY CONCEALED, INVISIBLE UNIVERSAL PRODUCT CODE AND AN ONLINE VERIFICATION SYSTEM USING A MOBILE PHONE

(76) Inventor: Allen K. Lo, 15A, 54 Hing Fat Street, Hong Kong (HK)

( * ) Notice: Subject to any disclaimer, the term of this patent is extended or adjusted under 35 U.S.C. 154(b) by 11 days.

(21) Appl. No.: 11/591,054

(22) Filed: Nov. 1, 2006

(65) Prior Publication Data
US 2008/0116276 A1    May 22, 2008

(51) Int. Cl.
*G06K 7/10* (2006.01)
(52) U.S. Cl. .................................. 235/462.01; 235/488
(58) Field of Classification Search ............ 235/462.01, 235/462.04, 468, 488, 494
See application file for complete search history.

(56) References Cited

U.S. PATENT DOCUMENTS

| | | | | |
|---|---|---|---|---|
| 4,552,442 A | * | 11/1985 | Street | 396/330 |
| 5,801,811 A | * | 9/1998 | Lo et al. | 335/22 |
| 6,226,093 B1 | * | 5/2001 | Lo et al. | 358/1.11 |
| 6,974,080 B1 | * | 12/2005 | Goggins | 235/462.01 |
| 7,341,200 B2 | * | 3/2008 | Alasia et al. | 235/494 |
| 2005/0200743 A1 | * | 9/2005 | Kawai et al. | 348/360 |
| 2005/0258250 A1 | * | 11/2005 | Melick et al. | 235/462.46 |
| 2006/0023197 A1 | * | 2/2006 | Joel | 355/77 |

* cited by examiner

*Primary Examiner*—Kumiko C Koyama
(74) *Attorney, Agent, or Firm*—Thomas, Kayden, Horstemeyer & Risley, LLP

(57) ABSTRACT

The prevention of counterfeiting labels for various products is addressed by introducing counterfeit-proof labels having an optically concealed, invisible universal product code.

The label is printed on a high-resolution micro optic photo chromogenic material. The color bars of the code are optically split and compressed in high resolution image elements and arranged at the pre-calculated optical blind angles in relation to the optical center of the lenticule and the viewing distance of the label, and due to the optical effect of the micro lenticule, the complete color product code is not visible when viewing at a normal viewing distance.

The camera of a mobile phone photographs the label at a close-up distance, with the lens of the camera regrouping the split image elements of all the color bars to reconstruct the product code that will be displayed on the screen of the mobile phone.

17 Claims, 7 Drawing Sheets

COUNTERFEIT-PROOF LABELS HAVING AN OPTICALLY CONCEALED, INVISIBLE UNIVERSAL PRODUCT CODE AND AN ONLINE VERIFICATION SYSTEM USING A MOBILE PHONE

TECHNICAL FIELD OF THE INVENTION

The present invention relates to counterfeit-proof labels having an optically concealed color universal product code printed on plurality views of the label and specifically the invention is based on the use of high resolution micro optic photo chromogenic material having large optical storage capacity for storing and displaying multi-view images.

The color bars of the code are arranged in a particular formation on different views of the label. Therefore, the color code is not visible at a normal viewing distance but can be seen or photographed by a digital camera of a mobile phone at a close up distance. The color photo of the code is sent by the mobile phone installed with related software to an Anti-counterfeiting Control Center for matching and verification.

BACKGROUND OF THE INVENTION

Counterfeiting is an old problem, despite the advancement in technology. There is still no practical solution to prevent counterfeiting effectively because all labels used on the products today can be easily counterfeited and more importantly, consumers cannot positively identify and verify the authenticity of a label.

It is therefore the objective of this invention to provide a counterfeit-proof label with an invisible universal product code to prevent counterfeiting. Another objective of this invention is to provide a counterfeit-proof label that can be easily and positively identified by the consumers. A further objective of this invention is to provide a counterfeit-proof label that can be further verified by a mobile phone (with a built-in digital camera and installed with related software) online by sending the photo of the product code to an Anti-counterfeiting Control Center (to be set up) for verification. Another additional objective of the invention is to provide a counterfeit proof label that can be read under visible light source by human eyes for immediate identification without special aids.

SUMMARY OF THE INVENTION

This invention relates to a counterfeit-proof label having optically concealed color universal product codes printed in a plurality of views in the lenticules of the micro-optic photo chromogenic material. The color bars of the code are arranged in a particular formation on different views of the label. The color code is not visible at a normal viewing distance but can be seen or photographed by digital camera at a close-up distance. The consumer can verify the code by viewing it on the mobile phone or the code may be sent to an anti-counterfeiting control center for matching and verification and informing the consumer via the mobile phone.

ADVANTAGES OF THE INVENTION

There are many advantages of using high resolution micro optic photo chromogenic material for the making of counterfeit-proof labels with an invisible universal product code and sending the photo of the product code by a mobile phone to an Anti-counterfeiting Control Center for verification including:

1. Easy identification and simplicity. By aiming the camera of the mobile phone at the label at a close up distance, the photo of the invisible color universal product code on the label will be displayed on the viewing screen and matching the code printed on the product or product package with the screen for verification.
2. Positive verification. Use the mobile phone to send the photo of the color universal product code to an Anti-Counterfeiting Center (to be set up) for matching and verification.
3. Speedy. The Anti-counterfeiting Centre will search and match the code by computer and advise the sender of the result in a matter of seconds.
4. Further verification. The sender will also receive additional information related to the product, including a picture of the product, name of the nearest distributor, expiration date and direction to use the product etc.
5. Follow-up instruction. In the event the product is found to be counterfeited, the Control Center will advise the sender the follow up procedure.
6. Law enforcement. The Center will notify the Legal Authority in the area to follow-up immediately.
7. User Friendly. The Anti-counterfeiting Control Center will communicate with the sender with voice, text or graphic message.
8. Counterfeit-proof. The label is printed on a high resolution micro optic material, the color bars of the code are optically split into a great number of high resolution image elements and interlaced in groups at the focal plane of each micro lens at a pre-calculated location in relation to the optical center of the lenticular and therefore the code is invisible at a normal viewing distance and is very difficult to counterfeit.
9. Convenience. Easy verification by using a mobile phone with a built-in digital camera installed with a related software at any location and at any time.
10. International standard. The invisible universal product code can be designed as an international standard Anti-counterfeiting code.
11. Globalization. The system can be implemented into the global mobile phones network.
12. Many applications. Can be designed as a label, ticket, credit cards, I.D. card and product packaging.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

According to the present invention, the counterfeit-proof label is printed on a high-resolution micro optic photo chromogenic material. The color bars of the universal code are optically split and compressed into a great number of micro image elements and optically interlaced in groups at the focal plane of each lenticule across the entire label. The interlaced image elements are arranged at optical blind angles in relation to the optical center of the lenticule at the viewing distance of the label, and due to the optical effect of the micro lenticule, the complete product code is not visible at a normal viewing distance. When photographed by the digital camera of a mobile phone, the camera lens optically regroups the split image elements of all the color bars and reconstructs the entire code which will be displayed on the viewing screen. The consumer can match the printed reference code on the label or on the product with the product code displayed on the screen for visual identification, or the color photo of the universal product code can be sent by a mobile phone installed with related software to an Anti-counterfeiting Control Center for computer matching and verification and the consumer will be advised of the result in a matter of seconds.

The color universal code is a group of color bars of any width, arrangement, or combination, and each particular design code is assigned to a product or brand name of the product. The micro optic photo chromogenic material is made of a high optical grade copolymer, the preferred thickness is between 0.1 mm to 1.5 mm with a frequency of between 2 to 50 lenticule per mm. The photo chromogenic layer is coated or attached to the focal plane of the micro lenticule with or without a permeable reflective layer.

Figure 1:
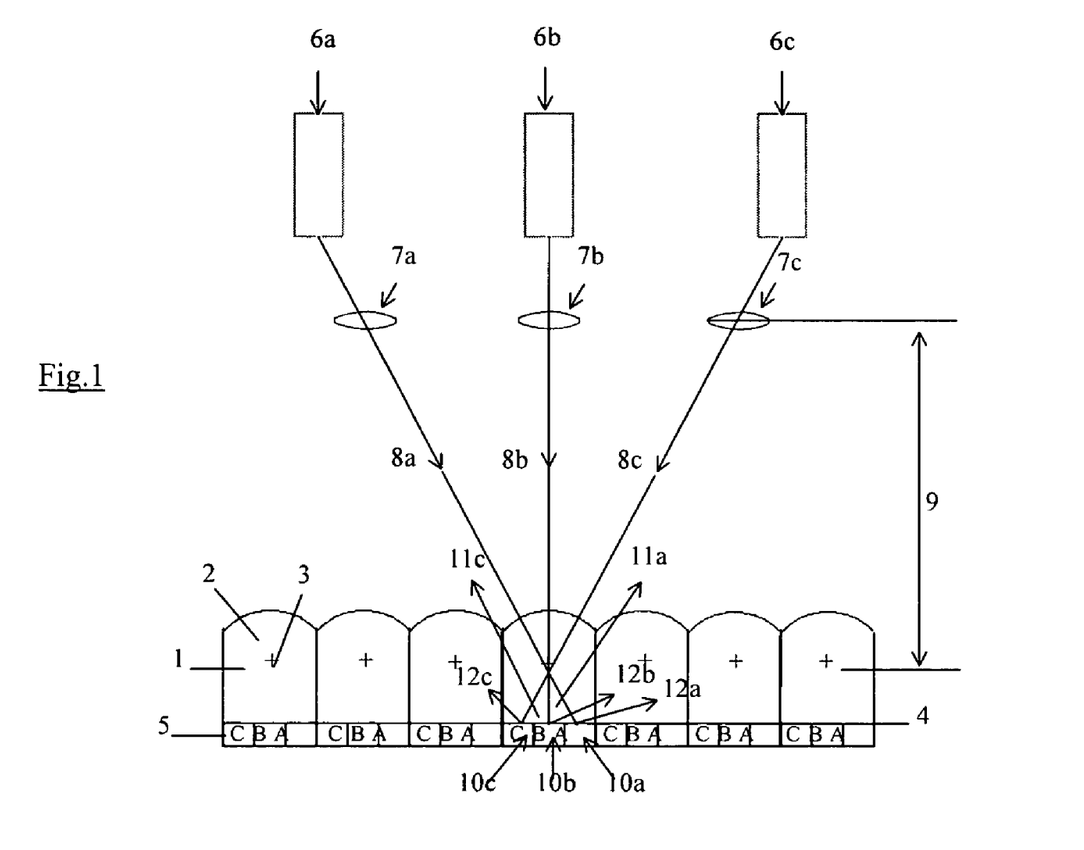
FIG. 1 is the enlarged cross-section of a small portion of the micro optic photo chromogenic material showing the optically split and compressed image elements.

FIG. 1 illustrates the structure of a micro optic counterfeit-proof label having invisible universal product codes. The numeral 1 denotes an enlarged cross-section of a portion of the label, 2 is a micro lenticule, 3 is the optical center of the micro lenticule, 5 is the photo chromogenic layer, 6a, 6b and 6c are the original color bars of the universal product code. Its images are projected through optical system 7a, 7b and 7C with light rays 8a, 8b and 8c, at a projection distance 9, projected on photo chromogenic layer 5, forming image elements 10a, 10b and 10c at angle between 11a and 11c on pre-calculated locations 12a, 12b and 12c.

Figure 2:
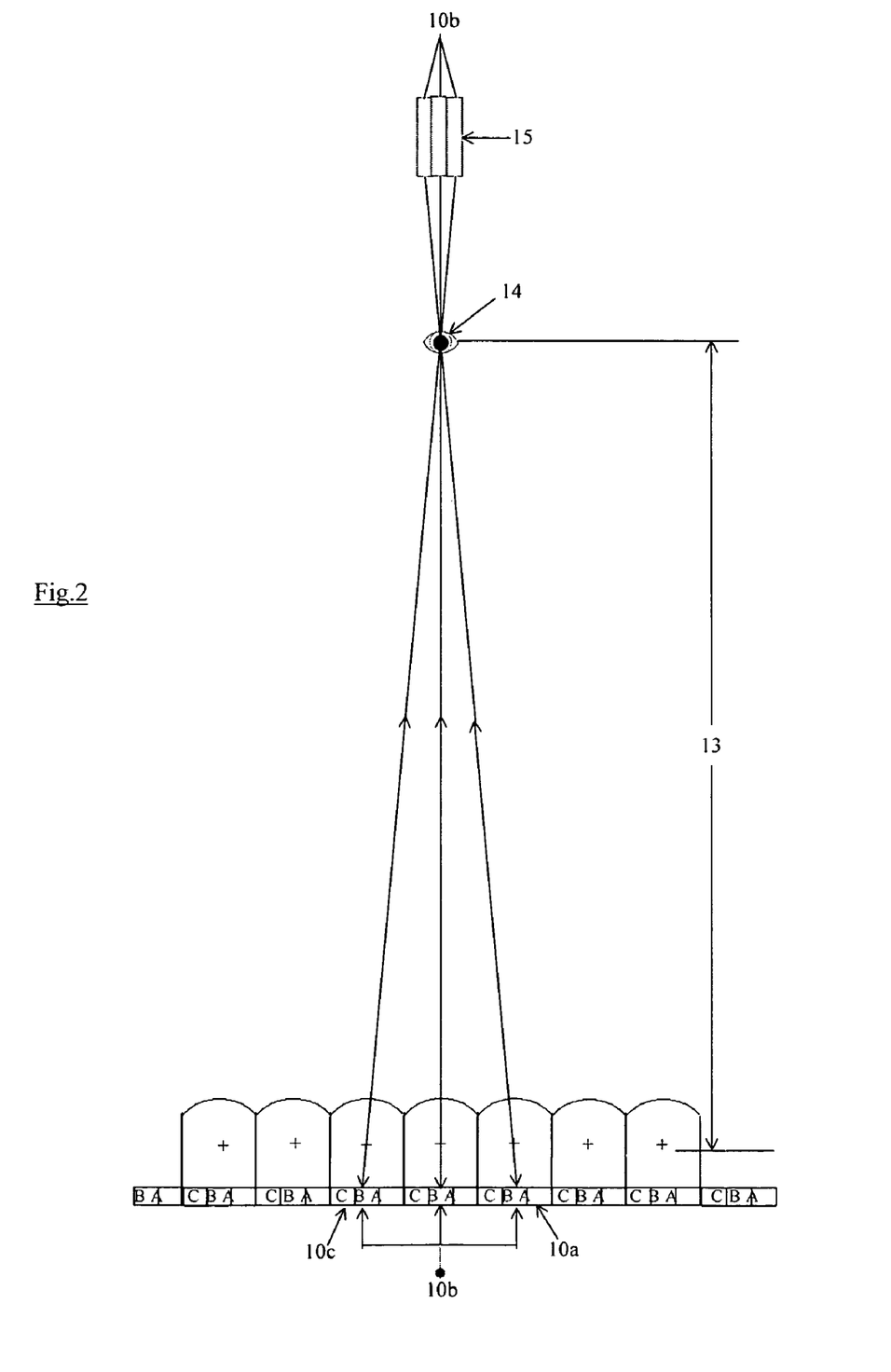
FIG. 2 is the enlarged cross-section of a small portion of the label illustrating the arrangement of the image elements of the color code in relation to the optical center of the lenticule so that the complete code is not visible at a normal viewing distance (only one color bar is visible).

FIG. 2 illustrates viewing the label at a normal viewing distance 13, (approx. 200-500 mm and approx. equal to projection distance and the projecting angle between 11a and 11c of FIG. 1), from view point 14. Only image elements 10b can be seen in reconstructed color bar of the product code 15, image elements 10a and 10c are located at optical blind angles and are not visible at view point 14, therefore, the complete color product code (with all the color bars) of 6a, 6b and 6c (FIG. 1) is not visible.

Figure 3:
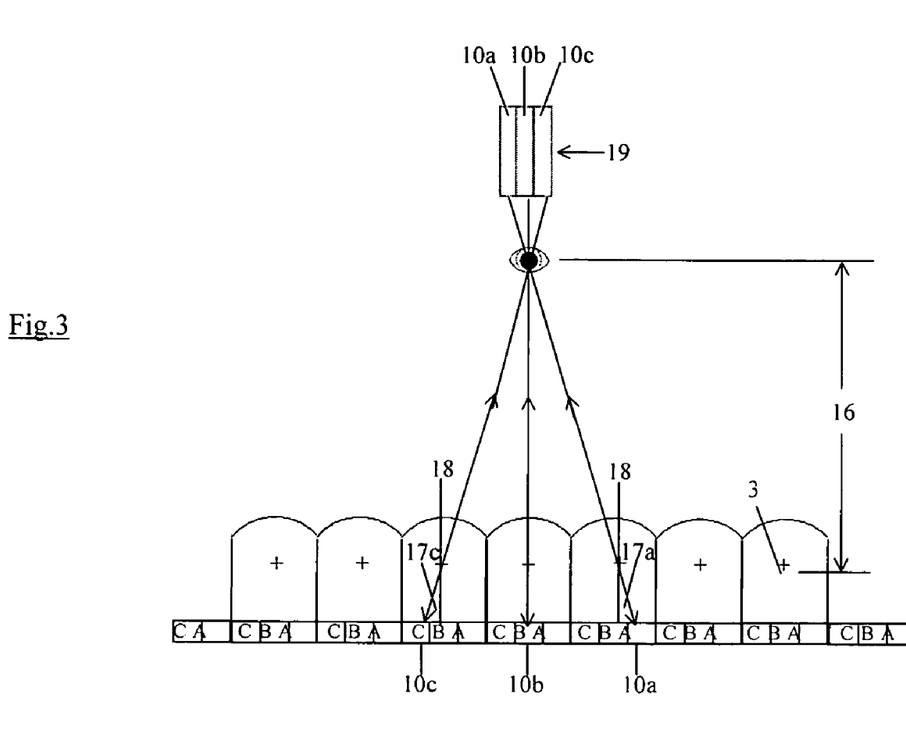
FIG. 3 illustrates the arrangement of the image elements of the color code in relation to the optical center of the lenticule, therefore, when viewed or photographed at a relatively close up distance, the complete code is visible.

FIG. 3 illustrates viewing the label at a close up distance 16, in this case, the viewing distance 16 is closer to the label than the viewing distance 9 (FIG. 1) and creates a greater projection angle 17a and 17c, the numeral 18 represents a vertical light ray through optic center 3 of the micro lenticule, therefore, from viewing distance 16, different image elements 10a, 10b and 10c will be seen under separate micro lenticules that reconstructs the complete color product code 19.

Figure 4:
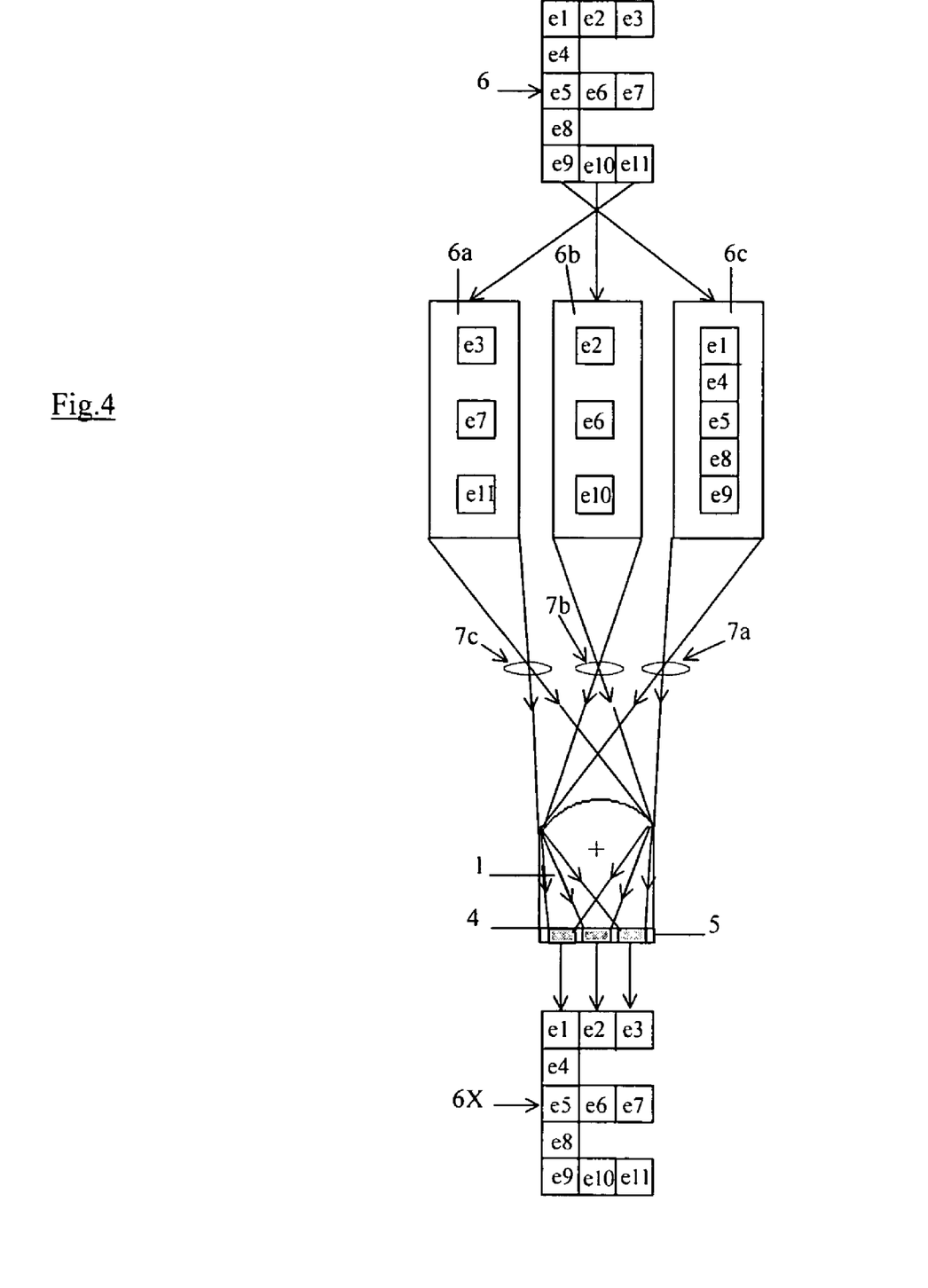
FIG. 4 is a schematic view showing an invisible product code formed by the letter "E."

FIG. 4 illustrates an invisible product code formed by the letter "E." The original image "E" is divided into 11 sub image e1 to e11 and divided in three groups 6a, 6b and 6c and projected through optical assembly 7a, 7b and 7c to form interlaced image 6x.

Figure 5:
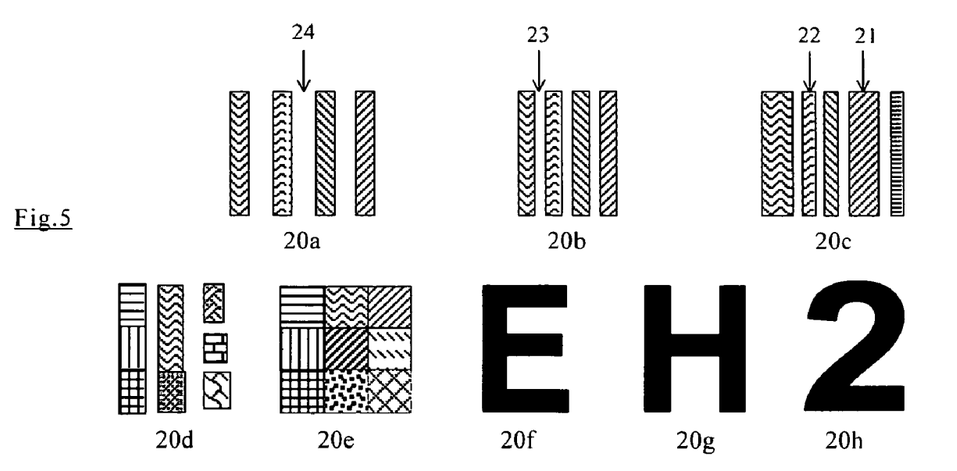
FIG. 5 is a schematic view showing different examples of color universal product codes.

FIG. 5 illustrates examples of different color universal product codes. The numerals 20a, 20b, 20c, 20d, 20e, 20f, 20g and 20h are universal product codes of different combinations of color bars, widths and spaces, 21 represents a color bar of wide width while the numeral 22 represents a color bar of narrow width and numeral 23 represents the narrow space between color bars and numeral 24 represents the wide space between color bars. FIG. 5 illustrates different designs of product code 20a to 20h. Each of the color bars of the product codes can be of any color. Each color bar, the width of the color bar and the spacing between color bars can represent a different number of letters, or a combination of color bars and spaces represent a particular name or group of information or number. The width of the color bars can be controlled by adjusting the apertures of the projection optics 7a, 7b and 7c.

Figure 6:
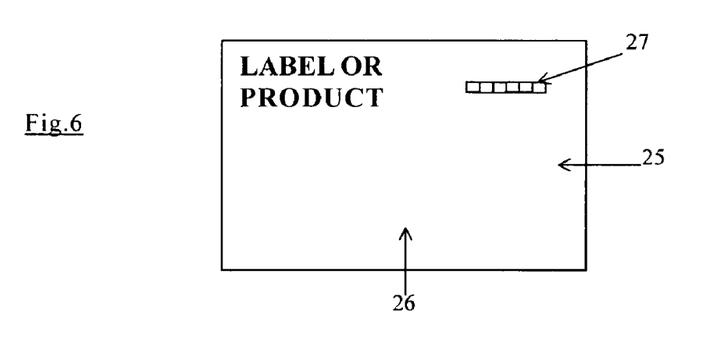
FIG. 6 shows a counterfeit-proof label concealed with an invisible universal product code and printed with a revealed matching code.

FIG. 6 shows a counterfeit proof label concealed with an invisible universal product code and printed with a revealed matching code. The numeral 25 represents the label or product, the numeral 26 represents the area printed with an invisible universal product code and the numeral 27 represents the revealing matching referent code.

FIG. 6 illustrates a micro optic label concealed with invisible universal product code and a printed matching referent code 27 for visual verification.

Figure 7:
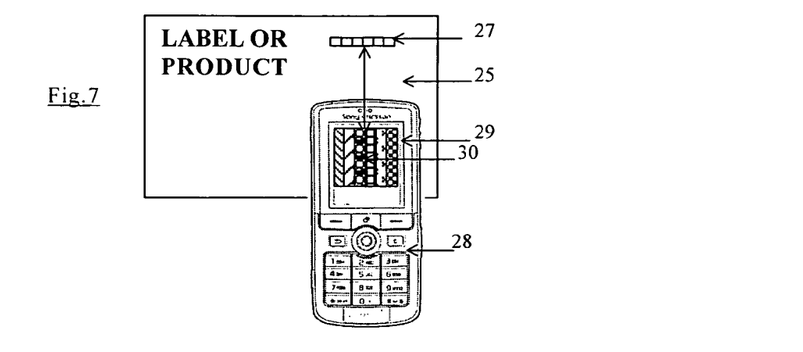
FIG. 7 shows a digital camera of a mobile phone aimed at the label at a relatively close up distance.

FIG. 7 shows a digital camera of a mobile phone aimed at the label at a relatively close up distance. The numeral 28 represents the mobile phone built-in with a digital camera, numeral 29 represents the screen of the phone, numeral 30 represents the reconstructed photo of the universal product code displayed on the screen. FIG. 7 illustrates aiming the camera of a mobile phone 28 at the label 25 at a close up distance. The camera lens regroups the image elements of the invisible product code to reconstruct the complete product code 30 and displays the image on the screen 29 of the mobile phone 28. The consumer can match the printed code 27 on the label with the reconstructed product code 30 on the screen for visual verification.

Figure 8:
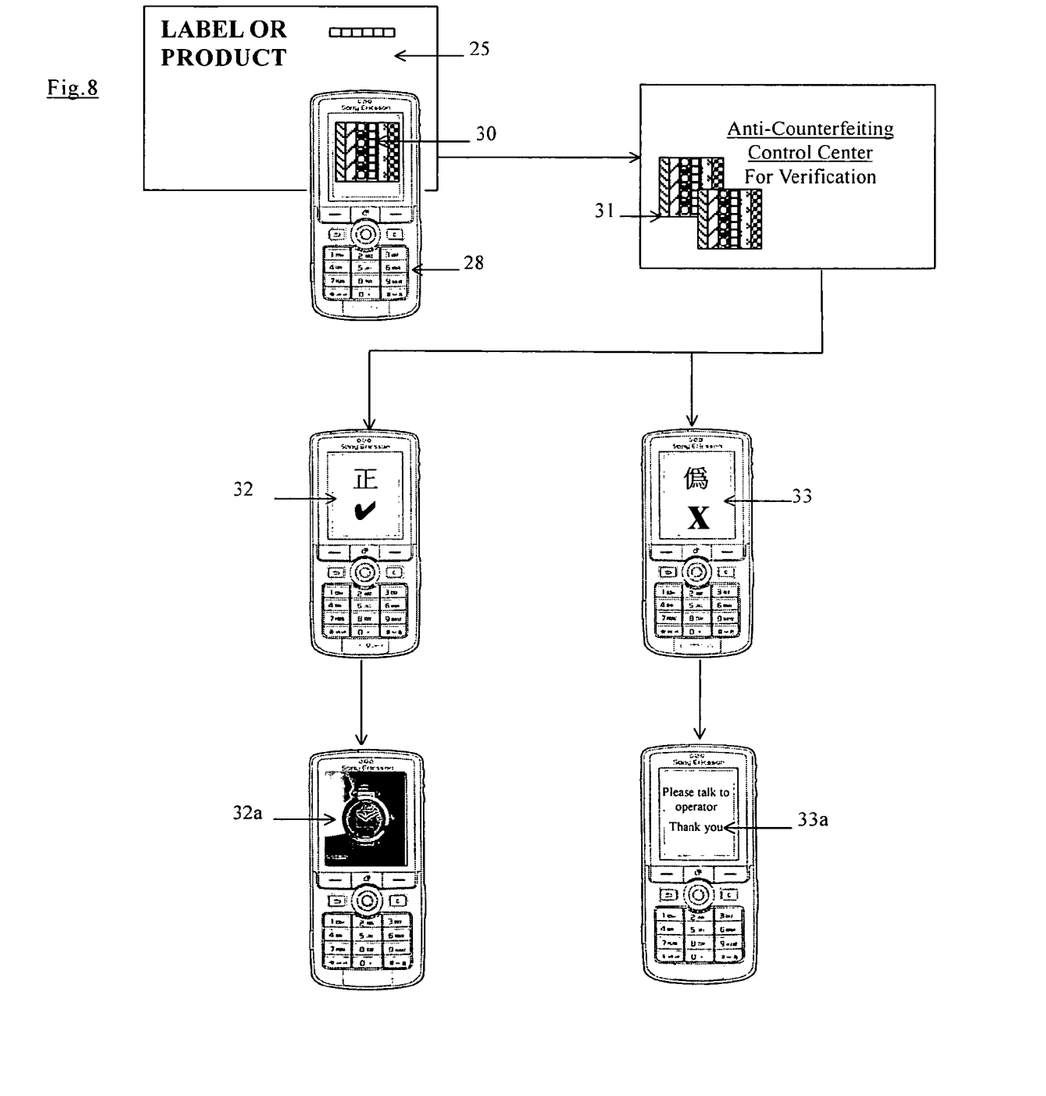
FIG. 8 is a flow chart which illustrates the verification system flow.

FIG. 8 illustrates the verification flow system. The numeral 31 represents the Anti-counterfeiting Control Center for matching and verifying the code, numeral 32 represents the camera screen displaying a "genuine sign" and message, numeral 32a represents displaying the photo of the product and related information, numeral 33 represents the camera screen displaying a "fake sign" and message, numeral 33a represents displaying the follow up procedures. FIG. 8 illustrates a verification method by using a mobile phone with a built-in camera and installed with a related software. The mobile phone 28 takes a close up photograph 30 of the label 25 and sends the photo 30 to an Anti-counterfeiting Control Center 31 (to be set up) for matching and verification. The center sends the result back to the mobile phone with an approval signal 32 and other related information of the product 32a, or a fake sign 33 and follow up recommendation 33a.

Figure 9:
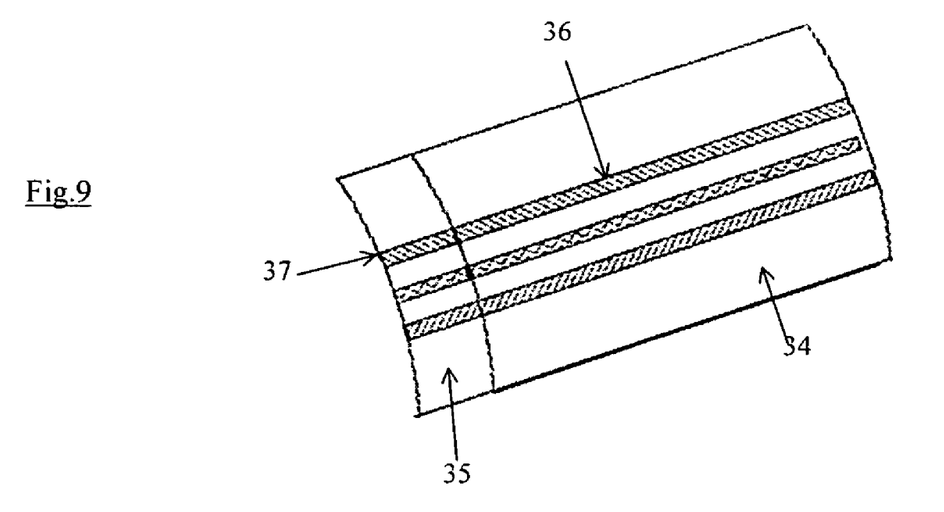
FIG. 9 shows a visual verification method by partially overlapping the label with a master reference label by slightly bending the two labels to match the color universal product codes appearing on both labels.

FIG. 9 illustrates another method of verification by practically overlapping the label 35 with a master reference label 34 and slightly bending the two labels to match the reconstructed color universal product code 36 and 37 on both labels.

Figure 10:
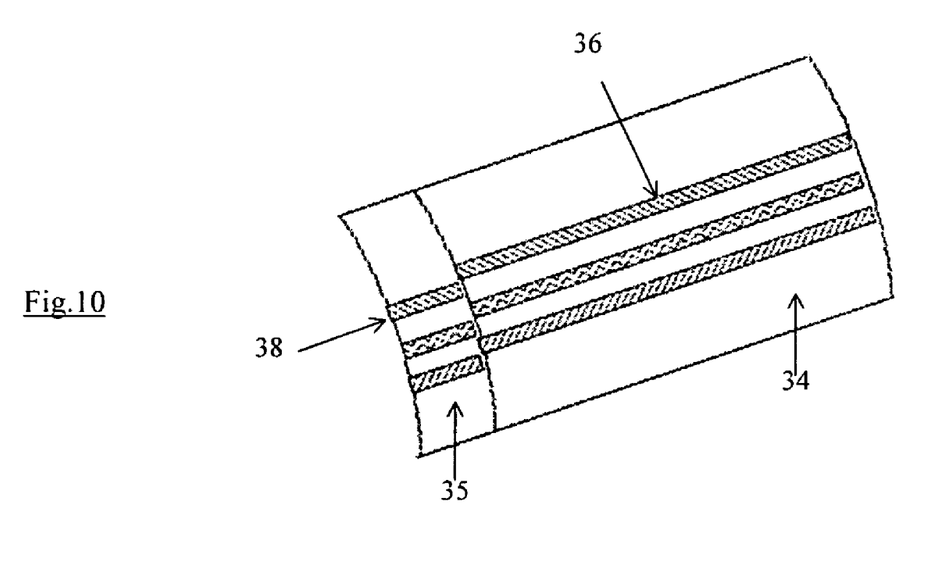
FIG. 10 shows the color universal product code of the label to be verified not matching with the color code of the master reference label.

FIG. 10 illustrates the situation where the reconstructed color universal product code 38 is mismatched with product code 36 due to the image elements of the label are not aligned during production and showing it is a counterfeit label.

Therefore, having thus described the invention, at least the following is claimed:

1. A method of verifying whether a product label is genuine or counterfeit which comprises:
   producing a counterfeit-proof label having an invisible universal product code by printing the code from a plurality of discrete views of the code on a photo chromogenic layer of a lenticular material, with each lenticule having an optical center, said printing being arranged so that at least a portion of the views of the code is printed at a pre-calculated optical blind angle in relation to the optical center of the lenticules at a normal viewing distance of the label; and
   viewing a label purporting to be a label for the genuine product through a digital camera having a viewing screen, said camera takes a close up view of the code on label so that the invisible code is viewed on the screen of the camera to determine if the code on the label matches a genuine code for the product.

2. The method of claim 1 in which a photograph of a reconstructed code is taken by a digital camera of a mobile phone and sent by the mobile phone to an anti-counterfeiting control center for matching with the genuine code and conveying an information on whether the code is genuine or not back to the mobile phone.

3. The method of claim 1, in which the number of discrete views range from 2 to 99.

4. The method of claim 1, in which the views of the label carry color of a color universal product code.

5. The method of claim 1, in which the views of the label carry one or more color universal product codes.

6. A method of claim 1, in which each of the color bars of the universal product code is concealed on different views of the label.

7. The method of claim 1, in which image elements of color bars are arranged in a particular optical order in relation to the optical center of a micro lenticular and viewing distance of the label so that the complete universal product code cannot be clearly read at a normal viewing distance of 20 cm and further.

8. The method of claim 1, in which image elements of the color bars are arranged in a particular optical order in relation to the optical center of the micro lenticule and viewing distance of the label so that the complete color universal product code can be read at a close up distance between 1 mm and 150 mm.

9. The method of claim 1, in which each of the color bars or spaces represents a number or an alphabet or a group of information.

10. The method of claim 1, in which a format, shape, design and combination of colors or a number of color bars represents a particular number or a set of numbers, information or names.

11. The method of claim 1, in which a reference revealing matching color code is printed on the same label or a separate label or on a package of the product for verification and matching with the concealed invisible color universal product code of the label.

12. The method of claim 1, in which the label is verified by partially overlapping the label with a master reference label by slightly bending the two labels to match the color universal product code appears on both labels.

13. The method of claim 1, in which the lenticular material has a refractive index between 1.45 and 1.65.

14. The method of claim 1, in which the lenticular material has a thickness between 0.1 mm and 1.5 mm.

15. The method of claim 1, in which the views of the label carry color bars of a color universal product code.

16. A system for producing verifiable counterfeit-proof labels which comprises:
    a printer for producing a counterfeit-proof label having an invisible universal product code by printing the code from a plurality of discrete views of the code on an optic photo chromogenic layer of a lenticular material, with each lenticule having an optical center, said printer prints at least a portion of the views of the code at a pre-calculated optical blind angle in relation to the optical center of each lenticule at a normal viewing distance of the label; and
    a digital camera with a viewing screen for viewing a label purporting to be a label for a genuine product, said camera takes a close up view of the code on label so that the invisible code is viewed on the screen of the camera to determine if the code on the label matches a genuine code for the product.

17. The system of claim 16 which also includes a mobile phone of which the digital camera is a part and an anti-counterfeiting control center to which a photograph of the label is conveyed by the mobile phone for verification of the genuineness of the label.

* * * * *